(12) United States Patent
Morin et al.

(10) Patent No.: US 8,847,775 B2
(45) Date of Patent: Sep. 30, 2014

(54) TANGIBLE CHARGE LEVEL AWARENESS METHOD AND APPARATUS USING AUGMENTED BATTERIES

(71) Applicant: Panasonic Corporation, Osaka (JP)

(72) Inventors: Philippe Morin, Goleta, CA (US); Ganymed Stanek, Palo Alto, CA (US)

(73) Assignee: Panasonic Corporation, Osaka (JP)

( * ) Notice: Subject to any disclaimer, the term of this patent is extended or adjusted under 35 U.S.C. 154(b) by 147 days.

(21) Appl. No.: 13/689,859

(22) Filed: Nov. 30, 2012

(65) Prior Publication Data

US 2014/0152448 A1    Jun. 5, 2014

(51) Int. Cl.
| | | |
|---|---|---|
| G08B 21/00 | (2006.01) | |
| H01M 10/48 | (2006.01) | |
| G08B 21/18 | (2006.01) | |
| H01M 10/42 | (2006.01) | |

(52) U.S. Cl.
CPC ............. *G08B 21/182* (2013.01); *H01M 10/48* (2013.01); *H01M 10/4257* (2013.01)
USPC ................ 340/636.2; 340/636.1; 340/636.19; 340/635; 340/660; 320/114

(58) Field of Classification Search
USPC ................. 340/636.1, 636.19, 636.2, 636.12, 340/636.15, 635, 691.6, 693.1, 660; 429/8; 320/114, 128, 106, 152; 324/427, 429
See application file for complete search history.

(56) References Cited

U.S. PATENT DOCUMENTS

| | | | |
|---|---|---|---|
| 5,652,502 A | 7/1997 | van Phuoc et al. | |
| 6,483,275 B1 | 11/2002 | Nebrigic et al. | |
| 7,295,129 B2* | 11/2007 | Eisenson | 340/636.1 |
| 7,411,515 B2* | 8/2008 | Giger et al. | 340/636.19 |
| 7,508,314 B2* | 3/2009 | Andres et al. | 340/636.19 |
| 7,564,223 B2 | 7/2009 | Krieger et al. | |
| 7,619,392 B2 | 11/2009 | Wang et al. | |
| 7,746,242 B2* | 6/2010 | Schwendinger et al. | 340/636.19 |
| 8,175,617 B2 | 5/2012 | Rodriguez | |
| 8,207,862 B2 | 6/2012 | Huang | |
| 2010/0219775 A1 | 9/2010 | Maglica et al. | |
| 2010/0277305 A1 | 11/2010 | Garner et al. | |
| 2011/0023130 A1 | 1/2011 | Gudgel et al. | |
| 2012/0062470 A1 | 3/2012 | Chang | |

* cited by examiner

*Primary Examiner* — Anh V La
(74) *Attorney, Agent, or Firm* — Harness, Dickey & Pierce, P.L.C.

(57) ABSTRACT

The augmented battery includes an internal motion sensor, charge condition monitor, annunciator and optional wireless communicator. When the augmented battery is installed in a device, it provides augmented capabilities not present in the device when using conventional batteries. The augmented capabilities include responding to implicit commands from the user (by simply lifting the device containing the augmented battery) and explicit commands (such as intentional motion or tapping gestures) by providing audible or vibrational response indicating the charge conditions of the cell within the battery. Wireless communication allows the augmented battery to interact with external devices, such as battery health monitor display devices and also with the device into which the battery is installed, giving the device new augmented functionality.

27 Claims, 7 Drawing Sheets

Sufficient Charge Level     *Fig-7*     Low Charge Level

TANGIBLE CHARGE LEVEL AWARENESS METHOD AND APPARATUS USING AUGMENTED BATTERIES

FIELD

The present disclosure relates generally to electrochemical and other forms of storage batteries. More particularly, the disclosure relates to an augmented battery and method of use that employs integral sensors, actuators, annunciators and optional wireless communication to enable new user interaction and control capabilities for battery operated devices, providing user awareness of charge conditions within the battery cell.

BACKGROUND

This section provides background information related to the present disclosure which is not necessarily prior art.

Batteries, whether disposable or rechargeable, provide the energy source for a wide range of portable devices. There is growing interest in so-called smart batteries, which communicate over a wired communication interface, known as the System Management Bus or SMBus to perform power management operations. In a typical smart battery system, an integrated circuit in the battery pack monitors the battery and reports information to external devices via the SMBus. The reported information might include battery type, model number, manufacturer, discharge rate, predicted remaining capacity, temperature and voltage (temperature and voltage being relevant to fast-charging).

In order to use this SMBus information, the device into which the battery is installed must be designed to make specific use of the information. For example, a laptop computer or mobile phone might be designed to report the battery charge remaining as a graphical icon on the device display screen. Similarly, battery charges incorporated into these devices make use of the temperature and voltage information in order to provide safe fast-charging.

While devices equipped with SMBus-enabled smart batteries are certainly advantageous, the conventional smart battery technology leaves thousands of products without any practical way to benefit from this technology. The simple flashlight, for example, is ill-equipped to take advantage of smart battery technology, for the simple on-off function of the flashlight has no way to utilize information coming from the SMBus. Moreover, even more sophisticated products, such as digital cameras, which might potentially use SMBus information, may still lack important charge level awareness information or lack the ability to communicate that information in a manner that is intuitive to the user.

When they think about it at all, most users make assumptions about the battery charge levels within their devices. The mindfully prepared user removes batteries and tests them frequently, or uses fresh batteries before embarking on an adventure where fresh batteries and charging stations will be unavailable. The careless or uninformed user simply proceeds on the adventure without giving battery charge level a second thought—until the batteries fail, perhaps far from civilization.

SUMMARY

This section provides a general summary of the disclosure, and is not a comprehensive disclosure of its full scope or all of its features.

The augmented battery of the present disclosure, and the method of alerting a user of the present disclosure, provides a solution that gives both mindfully prepared and carelessly uninformed users an intuitive sense regarding the charge conditions within the battery. The battery is designed to replace the traditional dumb battery with a smarter, augmented battery that senses the presence and intention of the device user, and provides the user with just-in-time information about charge levels. In one embodiment, by simply picking up the device, the battery provides an audible alert if charge conditions are inadequate. In more sophisticated embodiments, the battery responds differently to different gestural movements of the device (into which the battery is installed) and can even sense the presence of and provide battery status reports wirelessly to a battery health dashboard device or kiosk.

In accordance with one aspect, the disclosed augmented battery comprises at least one electrochemical cell or other type of cell capable of holding an electrical charge, such as supercapacitors that hold an electrical charge electrostatically. A motion sensor is physically disposed, such as within the battery casing, to sense motion of said cell. A charge monitor electrically coupled to said cell detects charge conditions within the cell. An annunciator is communicatively coupled to said charge monitor and is capable of emitting a notification sound or vibrational waves in response to charge conditions within said cell. The motion sensor, charge monitor and annunciator are interoperable to communicate the charge conditions within said cell in response to motion of the cell.

In accordance with another aspect, the battery is provided with an integrated processor, programmed to recognize and differentiate among predetermined motions caused by explicit interaction and implicit interaction from a user. Examples of explicit interaction include a shaking gesture, a knocking action, a waving gesture and combinations thereof. Examples of implicit interaction include lifting the device (containing the augmented battery) from a prior state of rest, manipulating the device under conditions of typical use.

The charge level awareness services are built-in and self-contained within the battery. The augmented battery does not interact with the host device, unless desired, and thus the host device does not need to be modified in any way. Since all the charge level awareness services are within the battery, one can simply replace the dumb battery of a device with the augmented battery to make these services available for that device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiment and not all possible implementations, and are not intended to limit the scope of the present disclosure.

Corresponding reference numerals indicate corresponding parts throughout the several views of the drawings.

DESCRIPTION OF THE PREFERRED EMBODIMENT

Example embodiments will now be described more fully with reference to the accompanying drawings.

Figure 1:
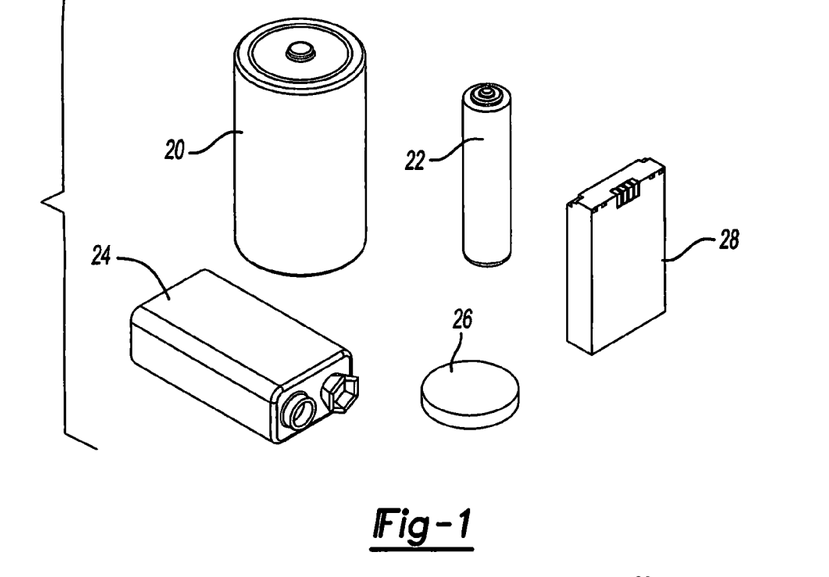
FIG. 1 illustrates several exemplary battery configurations into which the augmented components of the present disclosure may be incorporated.

The augmented battery of the present disclosure can be incorporated into a wide variety of different battery configurations. FIG. 1 illustrates some examples, where battery 20 is a D cell or C cell battery; battery 22 is a AA cell or AAA cell; battery 24 is a 9 volt battery; battery 26 is a lithium or silver oxide battery; and battery 28 is an exemplary rechargeable battery of the type used in digital cameras (there being numerous different packaging styles and configurations thereof).

Figure 2:
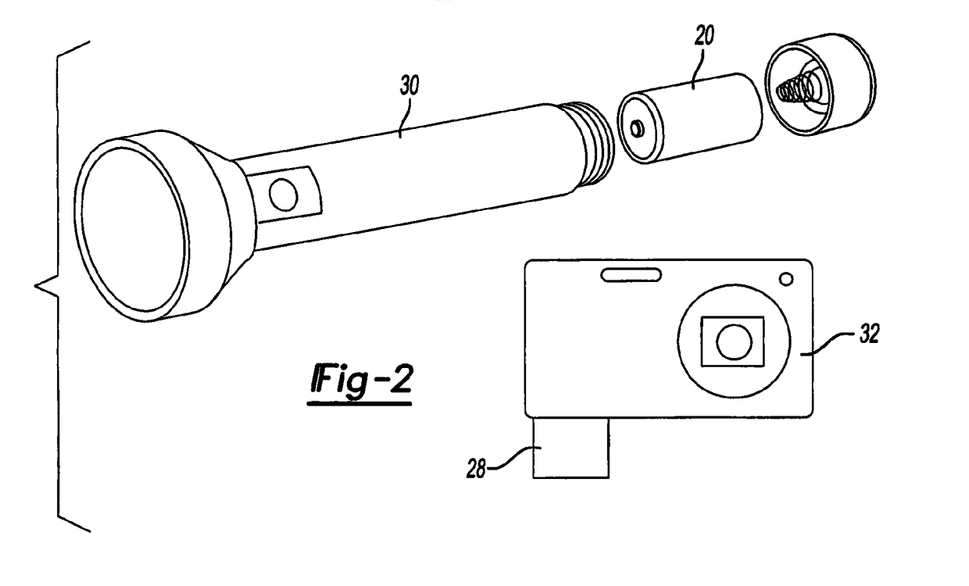
FIG. 2 illustrates two exemplary devices into which the augmented batteries of the present disclosure are installed.

Whether disposable or rechargeable, conventional batteries are designed to be installed in a wide variety of different portable devices. Two examples of such devices are shown in FIG. 2. FIG. 2 illustrates a flashlight 30 into which batteries of the style shown by battery 20 of FIG. 1 are installed, as illustrated. The digital camera 32 typically uses a rechargeable battery such as battery 28 (also shown in FIG. 1). It will be appreciated that the style and configuration of rechargeable batteries may vary from manufacturer to manufacturer. Thus, the exemplary battery 28 installed in the digital camera is merely intended to show the concept.

Figure 3:
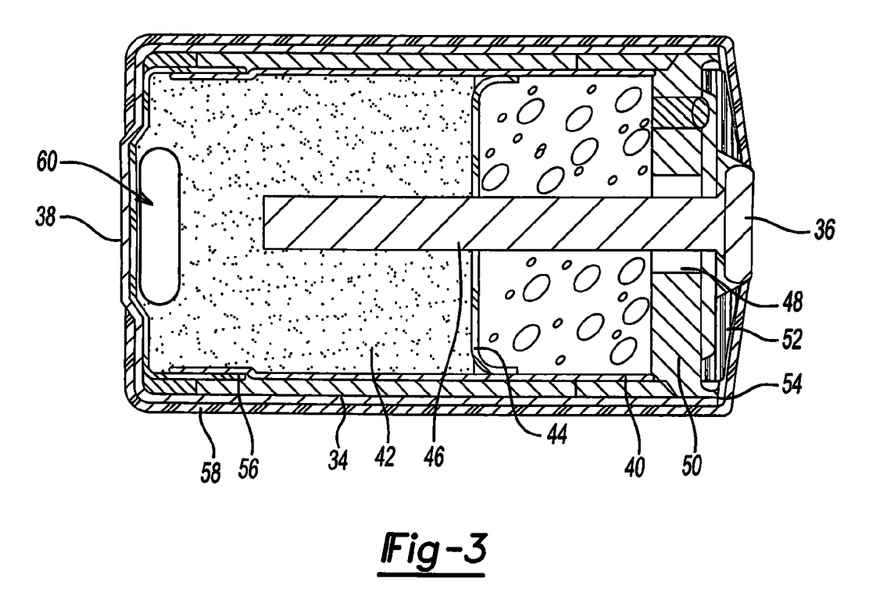
FIG. 3 is a cross-sectional view of an augmented battery, showing location of incorporated sensing, detecting and annunciating components.

FIG. 3 shows a cross-sectional view of a battery 20, having augmented circuitry in accordance with the present disclosure. In the illustrated cross-sectional view, the exemplary battery is shown as having a D cell form factor, as illustrated by battery 20 in FIG. 1. More specifically, the internal cross-section of the exemplary battery illustrates typical internal components of a rechargeable lithium cell type. However, it will be understood that the augmented components of the present invention are not limited to rechargeable lithium cells or any other battery chemistry or form factor. On the contrary, the techniques disclosed here are applicable to batteries based on other chemistries or charge storage technologies, and on other form factors as well.

As illustrated, the exemplary cell is encapsulated within cell can 34. The positive terminal 36 and negative terminal 38 lie at opposite ends of the cell can. The exemplary cell featured here uses a lithium anode 40 and a cathode 42 that are separated from one another by insulator 34. Current collector 46 extends into the cathode and electrically conducts charge to the positive terminal 36. The current collector passes through a glass-to-neutral seal 48 that is disposed along the central axis of the cell within the cell cover 50. The positive terminal 36 is held in place by a plastic cover 52, with the entire top assembly being secured by a welding seam 54. At the negative terminal end of the battery, a separator 56 is sandwiched between the lithium anode 40 and the cell can 34. The entire battery assembly is then surrounded by an insulating sleeve or jacket 58.

The augmented battery components are disposed within a self-contained package 60, which may be placed in a suitable location such as near the negative terminal end of the battery, as illustrated. The integrated package 60 houses the electronic components that provide the augmented battery functions. The entire augmented battery may thus be provided with embedded electronic components during battery manufacture. From the external appearance, the manufactured battery looks no different from a traditional dumb battery. However, the augmented features are integrally embedded and thus available to provide augmented services to the user. The integrated components of the augmented battery can be packaged together as a single unit to be placed inside the battery. Alternatively, the respective components can be placed at different locations within the battery package. In one preferred embodiment, the annunciator used to provide information to the user is preferably situated near an exterior component of the battery package, to allow sound to readily emanate through the case.

Figure 4:
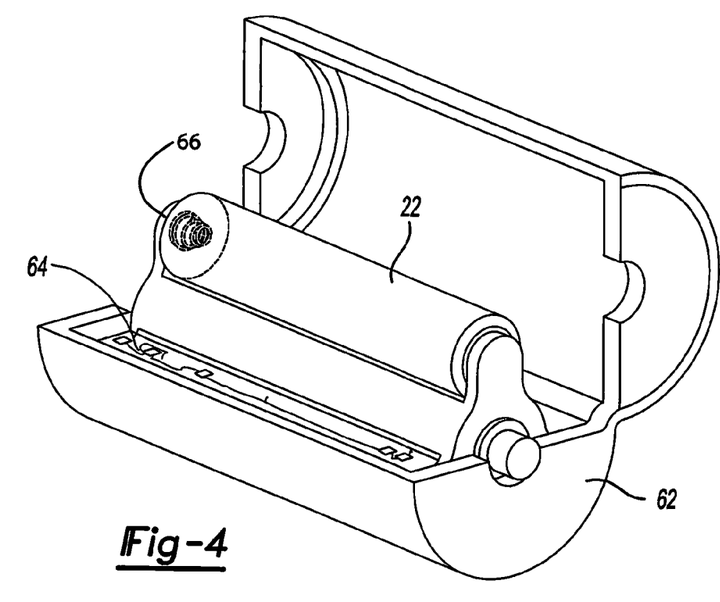
FIG. 4 is a cross-sectional view of an alternate embodiment of the augmented battery.

An alternate embodiment suitable for retrofit applications is illustrated in FIG. 4. In the alternate embodiment, a clamshell case opens to reveal the circuit board 64 onto which the augmented battery components are installed. The circuit board includes a battery holder 66 that is adapted to receive a traditional battery, as illustrated. In the illustrated example of FIG. 4, the clamshell case, when closed, defines a standard D cell form factor. The battery holder 66 receives a conventional AAA battery 22.

Figure 5:
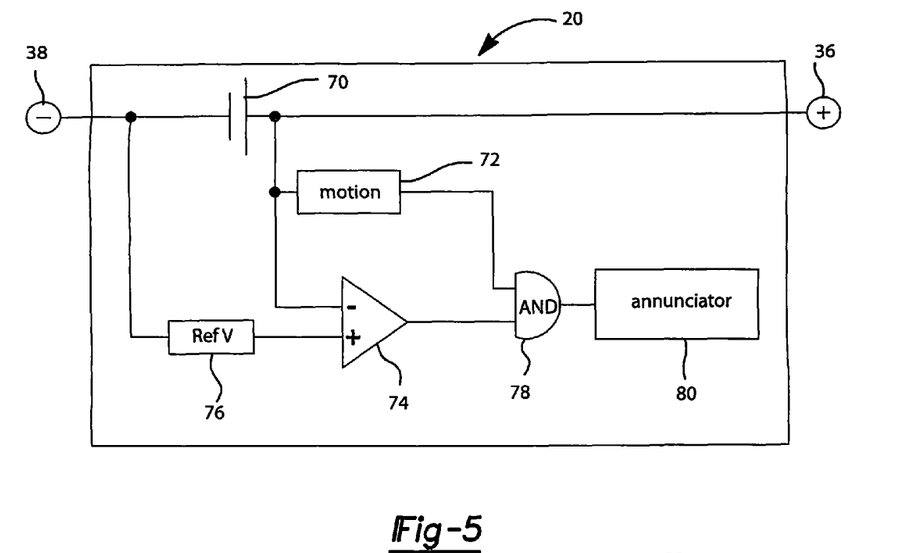
FIG. 5 is an electronic circuit diagram of an embodiment of the augmented battery using passive motion detecting components.

Referring now to FIG. 5, a first embodiment of electronic circuit used to implement the augmented battery will now be described. The circuit of FIG. 5 features a passive motion sensor, as will be described. The circuit of FIG. 6, discussed next, features an active motion sensor.

In FIG. 5 the augmented battery is shown generally at 20. The battery includes a positive terminal 36 and a negative terminal 38 that are respectively connected to the electrochemical cell 70. The cell 70 utilizes an electrochemistry capable of holding an electric charge, as will be understood by those of skill in the art. Other charge storage technologies may alternatively be used. The augmented battery employs a collection of integral components that are housed within the battery device and utilize power from the cell 70 to perform their respective functions. Included in the augmented battery of FIG. 5 is a motion sensor 72 that detects when the battery has been moved. In one embodiment, the motion sensor 72 may be implemented using an accelerometer. In another embodiment, the motion sensor 72 may be implemented using one or more passive switches, such as mercury switches that sense when the attitude of the battery has been changed (tilted). In one such embodiment, a set of three mercury switches disposed at mutually orthogonal (x,y,z) axes are used. In yet another embodiment, the motion sensor 72 may be implemented using a microchip orientation sensor, magnetic sensors (responsive to the Earth's magnetic field) and the like. The motion sensor 72 produces an output when motion (or change in attitude of the augmented battery) is sensed.

The augmented battery 20 further includes a comparator 74 that monitors the positive terminal of cell 70 on one input and monitors a reference voltage produced by a reference voltage device 76 on its other input. The comparator is biased to produce an output when the voltage across cell 70 falls below the reference voltage 76. In one embodiment, the reference voltage 76 is established using one or more diodes or zener diodes that establish a fixed voltage reference.

The output of the motion sensor 72 and comparator 74 are applied to two inputs of an AND gate 78 (a NAND gate may be used with the appropriate logic signal inversion) that produces an output when motion is detected and the voltage across cell 70 is below the reference level. The AND gate 78 supplies power to the annunciator 80, which then produces an audible beep signal to alert the user. The annunciator may take the form of a miniaturized audio oscillator coupled to a miniaturized speaker or other sound transducer. Alternatively, piezoelectric or other sound generation devices may be used.

The circuit of FIG. 5 may be implemented using simple, low-cost components making it a good choice for inexpensive augmented battery devices. The circuit of FIG. 5 has the additional advantage of consuming little power, as the circuit is able to passively rest (consuming little or no power) until and unless motion is detected.

Figure 6:
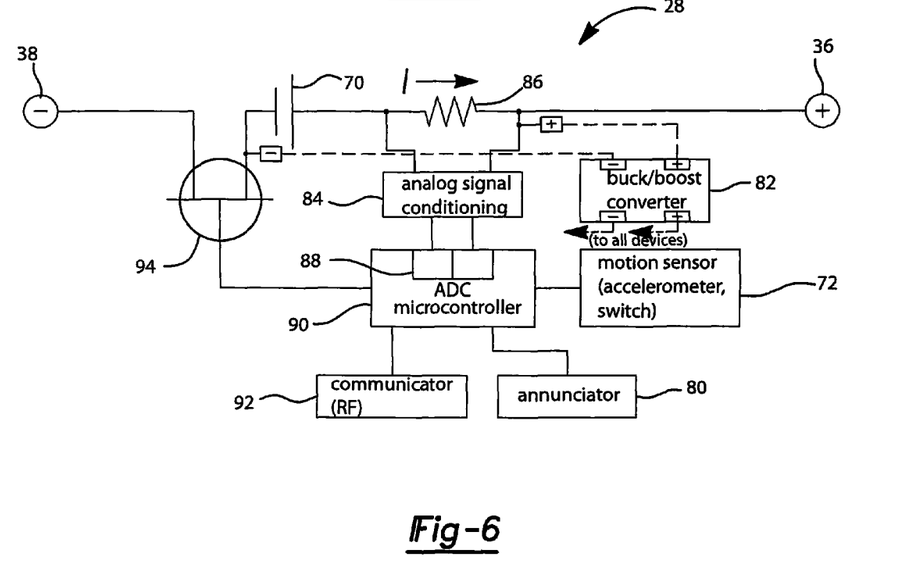
FIG. 6 is an electronic circuit diagram of an embodiment of the augmented battery using active motion detecting components and also featuring a processor.

A more sophisticated and feature-rich embodiment is shown in FIG. 6. The embodiment of FIG. 6 uses a processor or microcontroller that is programmed to perform the user alerting functions described herein. With reference to FIG. 6, the augmented battery is illustrated generally at 28. The battery includes a positive terminal 36 and a negative terminal 38 that are electrically coupled to the electrochemical cell 70. The embodiment of FIG. 6 employs a collection of integrated components that are powered by the cell 70. Some of the components require specific voltages for proper operation. Thus the circuit includes a power conditioning device in the form of a buck/boost converter 82. Buck/boost converter 82 draws power from the positive and negative terminals of cell 70, as depicted by dashed lines. The converter in turn provides regulated voltages to the various other components that make up the augmented battery circuit. To simplify illustrating, the specific connections between the boost/buck converter 82 and the other operating components have not been illustrated.

In this embodiment, charge conditions within the cell are measured by monitoring current flow I that is sensed by monitoring across a reference resistor R shown at 86. By sensing in this fashion, the circuit is able to determine not only the present charge state of the cell 70 but also its power usage. In this regard, the current flow over time may be captured, stored and analyzed to learn more about the charge condition than merely its instantaneous charge level. In the illustrated embodiment, the current I is sensed using an analog signal conditioning circuit 84 that couples to an analog to digital convertor 88 input of microcontroller 90. Although a microcontroller with integral analog to digital convertor is presently preferred, a separate analog to digital circuit may also be used.

Coupled to microcontroller 90 is the motion sensor 72, annunciator 80 and a communicator circuit 92 that communicates wirelessly using radio frequency (RF). The motion sensor may comprise any of the above described options, discussed in connection with FIG. 5. However, because this embodiment employs a microcontroller, a more sophisticated motion sensor may be utilized, including one that has geolocation capabilities using GPS, for example.

The microcontroller is programmed to analyze the data from motion sensor 72 and to provide information to the user via the annunciator 80 and also via the communicator circuit 82, based on the type of motion sensed. Microcontroller 90 may be programmed to discriminate between shaking motions, tapping motions and the like, so that different types of user-supplied motions are interpreted in different ways, if desired. The microcontroller detects discrete motion patterns generally spanning over a few tenths of a second (e.g., lifting or tapping) or over a few seconds (e.g., shaking). The microcontroller also uses a history of detection which is used for filtering, in order to discard undesired repetitive triggers. Only the one-tap event is deemed intentional within each one-, ten- or thirty-minute time window.

Tapping motion, such as the user tapping on the case of the device into which the augmented battery is installed, may also elicit user-intended motion response. Such tapping motion would be detected by microcontroller 90 when the motion sensor output supplies a sequence of short acceleration bursts (impulses) caused by repeated tapping. Such tapping motion is characterized not by long sustained motions in space but rather by a sequence of short jolts. If desired, the microcontroller may be programmed to count the number of taps received, so that the user can signify specific user-intended "requests" of the augmented battery by controlling the manner and number of taps supplied.

Inclusion of microcontroller 90 in the augmented battery also allows the augmented battery to perform other features not possible using conventional batteries. To illustrate this capability, the circuit of FIG. 6 includes a switch 94, such as a MOSFET device that is connected in series with the negative terminal of the battery. Microcontroller 90 can issue a signal to cause switch 94 to switch to an open circuit condition, thus disconnecting the augmented battery from the device into which it is installed. By controlling switch 94, the augmented battery can, for example, disconnect the battery from the device (to conserve power) until the device is lifted for use. Upon lifting, the motion sensor 72 would notify the microcontroller 90, which would, in turn, cause switch 94 to switch to a conducting state, allowing power to flow to the device.

In general, microcontroller 90 can supply a wide range of different functionality to the device into which the augmented battery has been installed. Using its ability to control supply of power to the device (as illustrated using switch 94) and also using the communicator 92, the augmented battery can add features to the device into which the battery is installed. By way of further illustration, detection of motion (or detection of arrival at a predetermined geolocation) can be used to produce an output of the annunciator, or to send a message to another device wirelessly using the communicator 92. For example, if the device into which the augmented battery is installed itself has wireless communication capability, the augmented battery can communicate directly with the device by communicating wirelessly over the same channel.

It should be appreciated that the ability to add features to a device by simply installing an augmented battery (designed to match the form factor of the conventional battery) is a powerful concept. In essence any battery-powered electrical or electronic device can be provided with augmented features, simply by exchanging an augmented battery for the conventional one. Moreover, such exchange of batteries does not preclude using a mixture of conventional and augmented batteries in the same device. A simple flashlight could be augmented by replacing only one of two conventional flashlight batteries with an augmented battery. Doing so would give the flashlight all of the augmented capabilities of the augmented battery, even though the other battery has no such capability.

Both of the circuits described in FIGS. 4 and 5, and other circuits performing functionally equivalent operations, are envisioned. While a processor or microcontroller 90 was illustrated in the circuit of FIG. 6, it will be understood that other embodiments may be implemented using application specific integrated circuit (ASIC) technology, which is considered an advantageous option for mass-produced augmented battery devices.

Implicit Interaction Use Case

Figure 7:
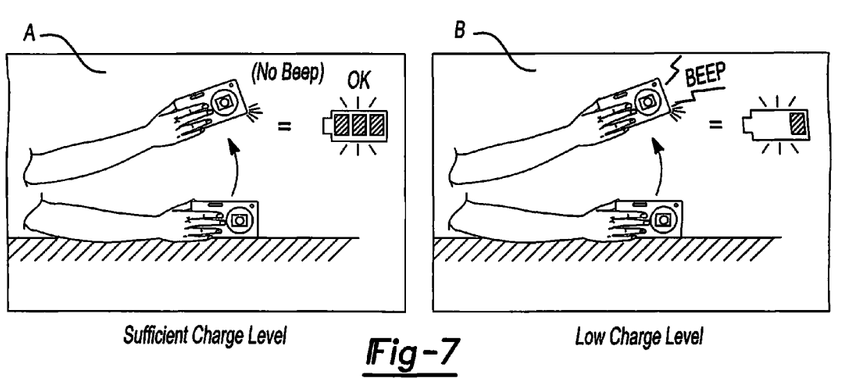
FIG. 7 is a use case diagram useful for understanding implicit interaction.

Referring now to FIG. 7, a first use case of the augmented battery has been illustrated. In this use case, it is assumed that the augmented battery has been installed in a portable device, in this case a digital camera. As shown at A, the user interacts with the augmented battery by simply picking up the camera, ostensibly to use it. In this case, the motion of lifting the camera activates the augmented features of the battery. As illustrated at A, if the battery charge conditions are acceptable (e.g., the battery is fully charged or sufficiently charged for use), then no sound is emitted from the annunciator. Alternatively, as shown at B, if the charge conditions are such that a low battery condition exists, then the annunciator produces an audible beep when the camera is lifted.

Figure 8:
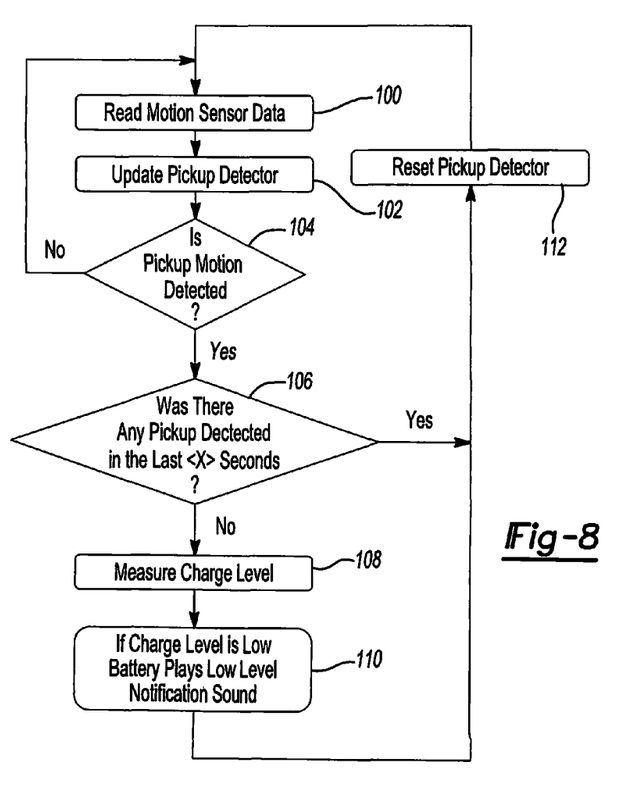
FIG. 8 is a flowchart diagram describing implicit interaction.

The flow chart of FIG. 8 describes this use case in greater detail. The interaction begins at step 100 where the motion sensor is read and the state of the pickup detector is updated at 102. Essentially, in step 100 the raw data value from the motion sensor is read and in step 102 that value is added to an accumulated value stored in memory. This is done to account for the real-world condition where a sensor may sporadically generate an output, due to a slight motion, which does not actually correspond to a movement event that needs to be responded to. By reading and updating an accumulated value, these small momentary movements are essentially ignored, in favor of the accumulated value. The accumulated value may be considered as integrating the individual motion sensor readings over time.

In a processor-implemented embodiment, such as the embodiment of FIG. 6, these steps 100 and 102 may also be performed by defining a data structure stored within memory accessible by the processor to represent the current pickup detector status. The pickup detector status stores in memory a time stamp indicating when the motion sensor data was read at step 100, and also a data value indicative of the state of the motion sensor when read. For example, if the motion sensor includes an accelerometer, the data from the accelerometer may be read and stored in the pickup detector data structure along with the time stamp corresponding to the sensor data reading event.

If the motion sensor includes a simple passive switch, such as a mercury switch, the data stored by the pickup detector data structure would simply represent the accumulated record of past open/close state "messages" from the switch. Other types of motion sensors are similarly recorded in the pickup detector data structure.

Next, at step 104, if a pickup motion is not detected (the accumulated motion value does not exceed a predetermined threshold), control branches back to step 100 where the sensor reading and value accumulating process repeats.

If the accumulated value does indicate at step 104 that motion is detected, the process then checks at step 106 to determine if there was any prior pickup detection within a predetermined number of seconds (the last X seconds). This check is performed so that if a pickup event has already issued an annunciated message to the user within the last X seconds, any further messages are suppressed. In this regard, continually repeating an annunciated message so long as motion is detected can be annoying to the user and unnecessarily consumes battery energy. Thus if a pickup in the last X seconds has been detected, the accumulated pickup detector value being stored at step 102 may be reset at step 112.

If this is the first motion detection within X seconds, the processor then proceeds to measure the charge level at step 108. It compares the charge level to a predetermined reference level and if the charge level is below the predetermined reference level, the processor instructs the annunciator to play a low level notification sound at step 110. Upon issuing the annunciated sound, the accumulated value being maintained at step 102 is reset at step 112.

Explicit Interaction Use Case

Figure 9:
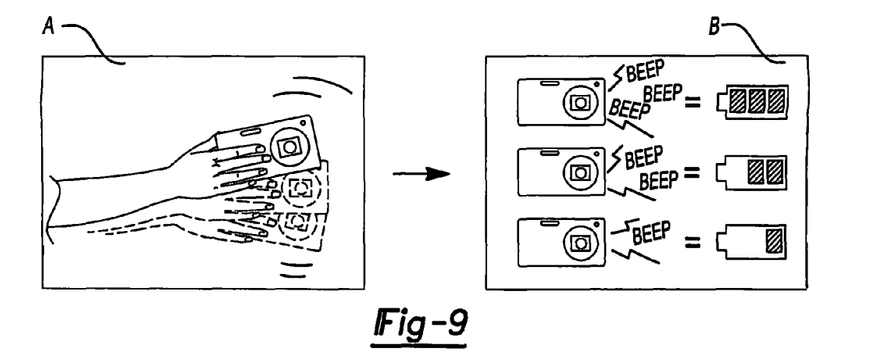
FIG. 9 is a use case diagram useful for understanding explicit interaction.

As shown in FIG. 9, the explicit use case involves intentional gestures made by the user to interrogate the augmented battery system. As shown at A, the intentional gesture may be, for example, a shaking gesture, which then invokes a report as diagrammatically shown at B. A report issues a selectively chosen number of audible beeps based on the charge level. For example, a fully-charged battery may emit three beeps, a half-depleted battery might emit two beeps and a low battery might emit one beep.

Figure 10:
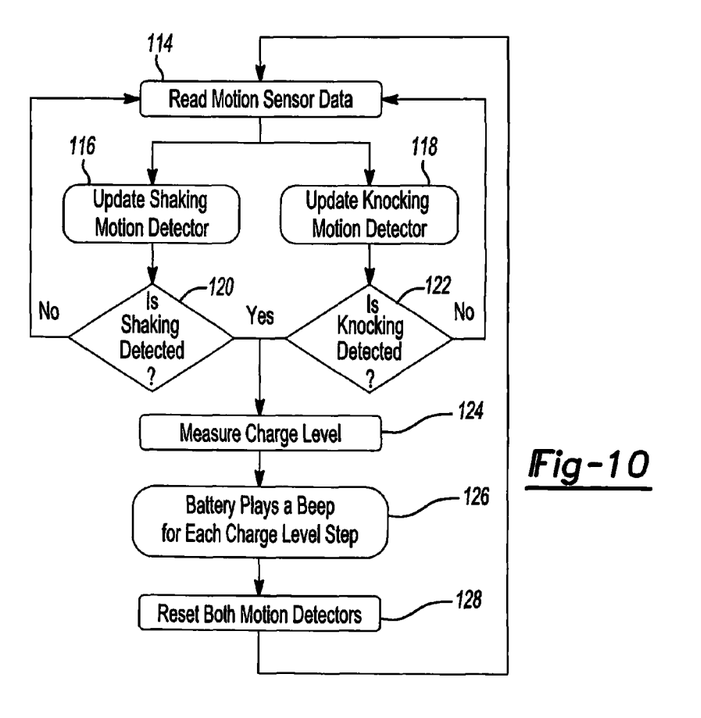
FIG. 10 is a flowchart diagram describing explicit interaction.

FIG. 10 gives the flow chart for the explicit interaction use case as would be performed by an augmented battery having a processor. The process begins by reading the motion sensor data at 114. The processor then analyzes the motion data by comparing the data with pre-stored motion patterns including, for example, a first pattern describing a shaking motion and a second pattern describing a knocking motion (where the device is abruptly tapped on a hard surface). The data read from the sensor at step 114, thus analyzed at 116 and 118 to determine whether either of the pre-designated motions are detected. In this regard, while shaking motion and knocking motion have been specifically mentioned in the flow chart, other types of gestural motions such as waving gestures and other more complicated changes in position and attitude (yaw, pitch, roll) may also be analyzed. If any of the pre-designated motions are detected, the charge conditions are measured at step 124 and the annunciator is then instructed to issue the appropriate annunciator message at step 126, depending on the level of charge measured. If the pre-designated motions are not detected, the program loops back to step 114, as illustrated. Once the annunciator has issued its message to the user at 126, the motion sensors are reset at step 128.

Battery Health—Dashboard Use Case

Figure 11:
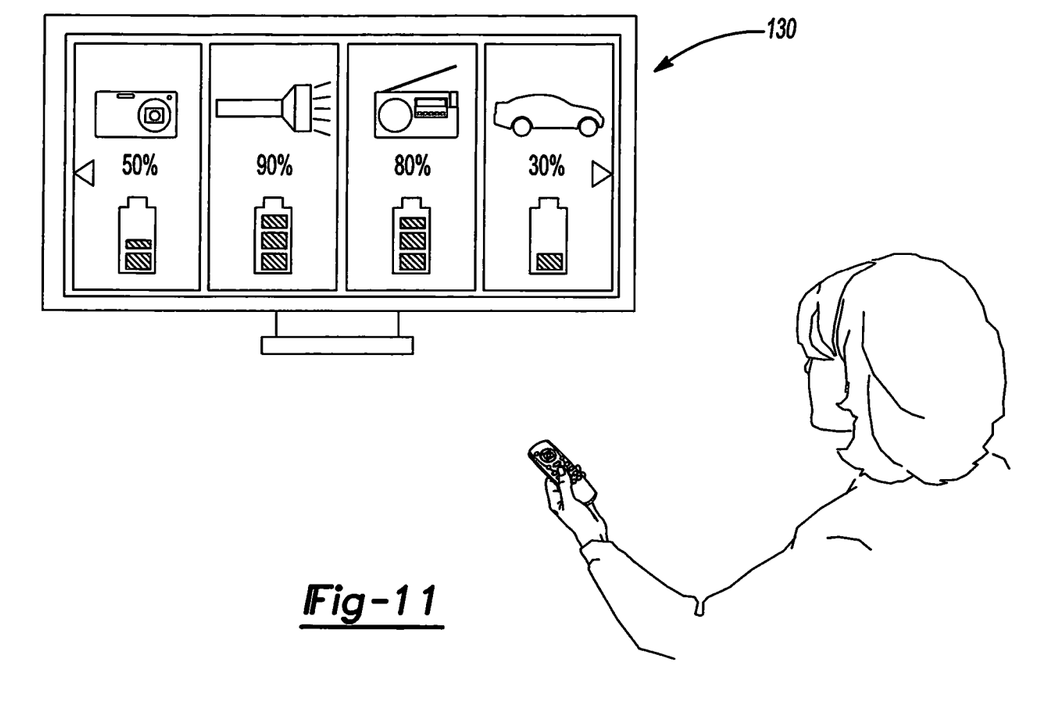
FIG. 11 is a use case diagram useful for understanding how the augmented battery interacts with an external battery health dashboard.

As shown in FIG. 11, when the augmented battery is equipped with a wireless radio frequency communicator, an enhanced annunciation technique is possible. The enhanced technique uses a battery health dashboard 130 that provides a graphical indication of the charge conditions within the battery cell. Interaction between the radio frequency communicator and the dashboard 130 can be initiated by automatic location detection or by explicit user interaction. Automatic location detection may be performed by using a geo-locator device within the augmented battery, which device may also be used to provide motion sensing data. Alternatively, location information can be inferred using near field communication techniques. In other words, when the portable device containing the augmented battery is brought within a near field proximity or within RF communication range of the dashboard, data from the charge monitor are collected and sent to the dashboard for display.

In a similar fashion, communication with the dashboard can be by explicit user interaction where a predetermined gestural motion, such as shaking or waving the portable device and standing near the dashboard, causes the charge monitor to be polled and data sent wirelessly to the dashboard device.

Figure 12:
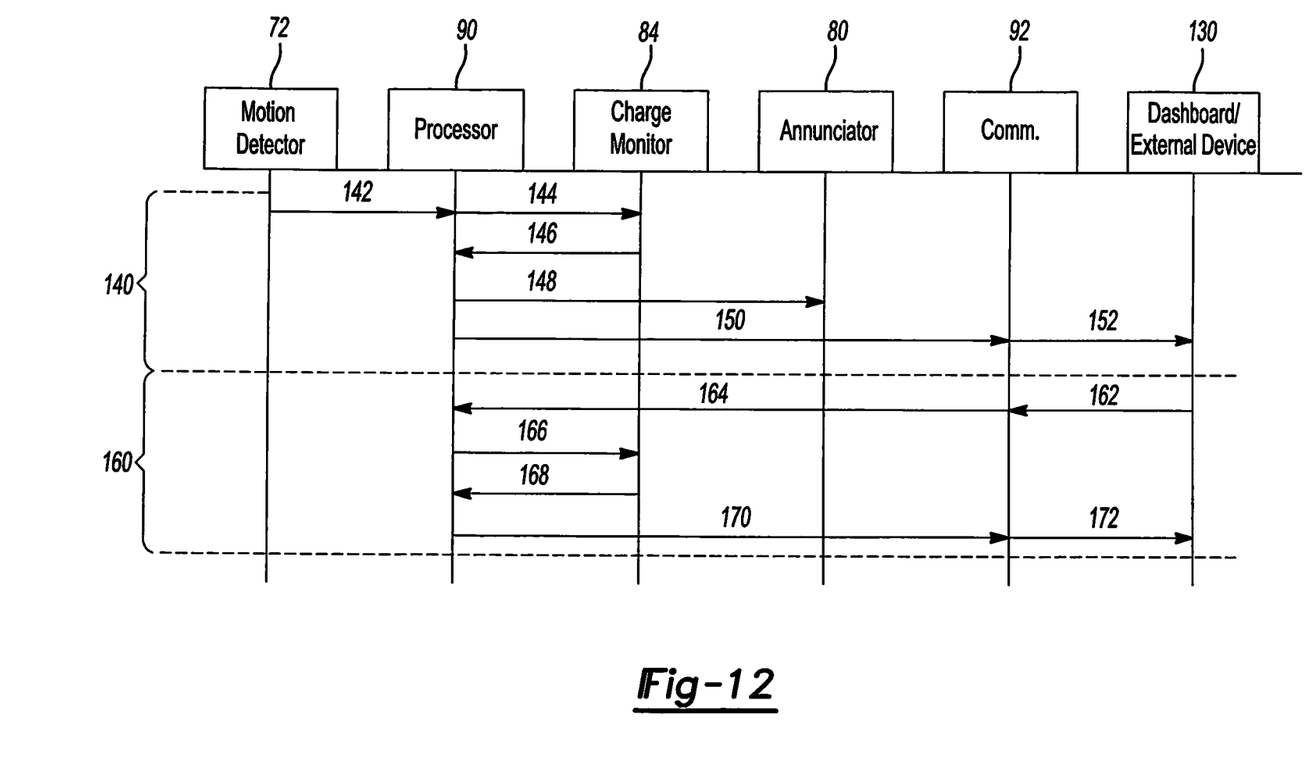
FIG. 12 is a process flow diagram showing interaction between the augmented battery and the dashboard of FIG. 11.

FIG. 12 illustrates some additional capabilities of the augmented battery when wireless communication is available. Specifically, FIG. 12 shows how the various components of the augmented battery communicate with one another and also potentially with external devices, such as the dashboard or other external devices, including the device into which the augmented battery is installed.

In FIG. 12, two different component interaction dialogues have been illustrated at 140 and 160. Describing dialogue 140 first, the motion detector 72 detects motion and notifies processor 90 [message 142]. The processor then interrogates the charge monitor 84 [message 144] and receives its reply [message 146]. Assuming in this case that the charge level is low, processor 90 then issues a command or otherwise energizes annunciator 80 [message 148] causing an alert to be sent to the user (not shown). In addition (or in the alternative), processor 90 also sends a command or message to the communicator circuit 92 [message 150] and the communicator circuit 92 converts the message into a radio frequency signal that is then communicated to the dashboard 130 or other external device [message 152]. This communication could cause the dashboard 130 to display charge state information and other information about the augmented battery for visual presentation to the user, or for use by other communicating systems.

As shown at 160, the augmented battery can participate in two-way conversations with external devices. Thus the external device can issue a message [message 162] that is picked up by the communicator circuit 92. The communicator circuit relays the message to processor 90 [message 164] which then responds by performing an augmented battery function, such as reading the charge level of the cell. This is performed by issuing a control message to the charge monitor 84 [message 166] and receiving the reply [message 168]. Processor 90 might then send a report back to the external device via the communication circuit 90 [messages 170 and 172].

The second dialogue thus illustrates some of the additional bidirectional communication capabilities of the augmented battery. Many different control and communication features are empowered by the augmented battery in this fashion.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A battery comprising:
   at least one cell capable of holding an electrical charge;
   a motion sensor physically disposed to sense motion of said cell;
   a charge monitor electrically coupled to said cell and capable of detecting charge conditions within the cell; and
   an annunciator communicatively coupled to said charge monitor and capable of emitting notification sound or vibrational waves in response to charge conditions within said cell,
   the motion sensor, charge monitor and annunciator being interoperable to communicate the charge conditions within said cell in response to motion of the cell.

2. The battery of claim 1 wherein the detected charge condition is the quantity of charge held within the cell.

3. The battery of claim 1 wherein the detected charge condition includes power usage.

4. The battery of claim 1 further comprising a processor that interoperably couples said motion sensor, charge monitor and annunciator to communicate charge conditions within said cell in response to a predetermined motion of the cell.

5. The battery of claim 4 wherein said processor is programmed to recognize a predetermined motion caused by explicit interaction from a user selected from the group consisting of a shaking gesture, a knocking action, a waving gesture and combinations thereof.

6. The battery of claim 4 wherein said processor is programmed to recognize a predetermined motion caused by implicit interaction from a user selected from the group consisting of lifting from a prior state of rest, manipulating a device into which the battery is installed and combinations thereof.

7. The battery of claim 1 wherein said motion sensor, charge monitor and annunciator are interoperable to annunciate a sound or vibration when the charge condition corresponds to a low charge level.

8. The battery of claim 1 wherein said motion sensor is selected from the group consisting of accelerometers, geolocation sensors, gyroscope sensors, incline sensors and mercury switches.

9. The battery of claim 1 wherein the motion sensor activates the charge monitor in response to movement after a period of no movement.

10. The battery of claim 1 wherein said motion sensor comprises a passive switch.

11. The battery of claim 1 further comprising a battery casing and wherein the cell, motion sensor, charge monitor and annunciator are physically disposed within said battery casing.

12. The battery of claim 1 further comprising a wireless radio frequency communicator communicatively coupled to the charge monitor and capable of emitting radio frequency signals in response to charge conditions within said cell.

13. The battery of claim 4 further comprising a wireless radio frequency communicator communicatively coupled to the processor and capable of emitting radio frequency signals in response to charge conditions within said cell.

14. The battery of claim 4 further comprising a wireless radio frequency communicator communicatively coupled to the processor and capable of receiving radio frequency signals that cause the processor to interrogate said charge monitor.

15. A battery display system according to claim 1 further comprising a dashboard device physically separate from said battery that includes a display to visually show charge conditions within a cell, and wherein said battery further comprises a wireless radio frequency communicator communicatively coupled to the charge monitor and capable of wirelessly communicating with said dashboard device.

16. A method of alerting a user of a battery-operated device to the charge conditions of a cell within the battery, comprising:
   installing a battery into the device, the battery having an integrated motion sensor, a charge monitor providing data reflective of charge conditions within a cell of said battery, and an annunciator;
   detecting motion of the device using the motion sensor;

upon detecting motion of the device, using data from the charge monitor to assess charge conditions within said cell; and if assessed charge conditions are contrary to predetermined normal parameters, causing said annunciator to provide an indication to the user alerting that charge conditions have deviated from normal parameters.

17. The method of claim 16 wherein said annunciator produces an audible sound and said indication to the user is provided by audible sound emanating from the battery.

18. The method of claim 16 wherein said annunciator produces vibration and said indication to the user is provided by vibration originating from the battery.

19. The method of claim 16 wherein said motion sensor is responsive to explicit interaction from a user selected from the group consisting of a shaking gesture, a knocking action, a waving gesture and combinations thereof.

20. The method of claim 16 wherein said motion sensor is responsive to implicit interaction from a user selected from the group consisting of lifting from a prior state of rest, manipulating a device into which the battery is installed and combinations thereof.

21. The method of claim 16 wherein said charge monitor assesses charge conditions within the cell selected from the group consisting of charge level and power usage.

22. The method of claim 16 wherein said battery further includes a processor integrated with said motion sensor, charge monitor and annunciator and wherein the method further comprises using the processor to detect at least one predetermined motion of the device using the motion sensor data.

23. The method of claim 16 wherein said detecting motion step further comprises detecting movement after a predetermined interval of no movement.

24. The method of claim 16 further comprising detecting motion of the device using a passive switch.

25. The method of claim 16 wherein the battery further includes a wireless radio frequency communicator integrated with said motion sensor, charge monitor and annunciator and wherein the method further comprises using the communicator to emit radio frequency signals in response to charge conditions within said cell.

26. The method of claim 25 further comprising using the communicator to supply information to an external dashboard device that is physically separate from the device into which the battery is installed.

27. The method of claim 25 wherein said battery further includes a processor integrated with said motion sensor, charge monitor and annunciator and wherein the method further comprises using said communicator to receive radio frequency signals that cause the processor to interrogate said charge monitor.

* * * * *